No. 738,437. PATENTED SEPT. 8, 1903.
N. S. HARTER.
APPARATUS FOR CHANGING CHARACTER OF ELECTRIC CURRENTS.
APPLICATION FILED MAY 27, 1903.
NO MODEL.
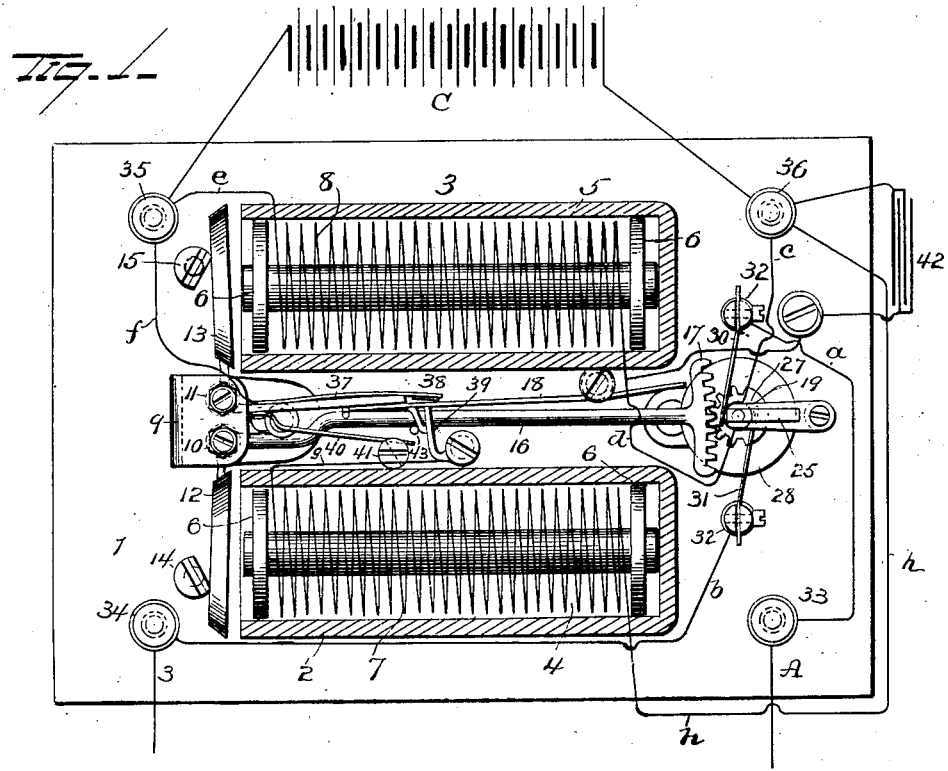
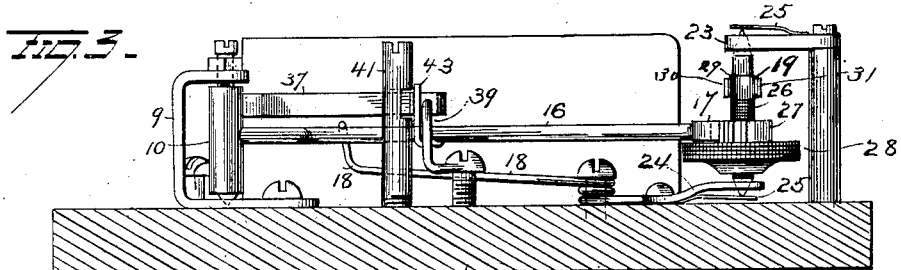
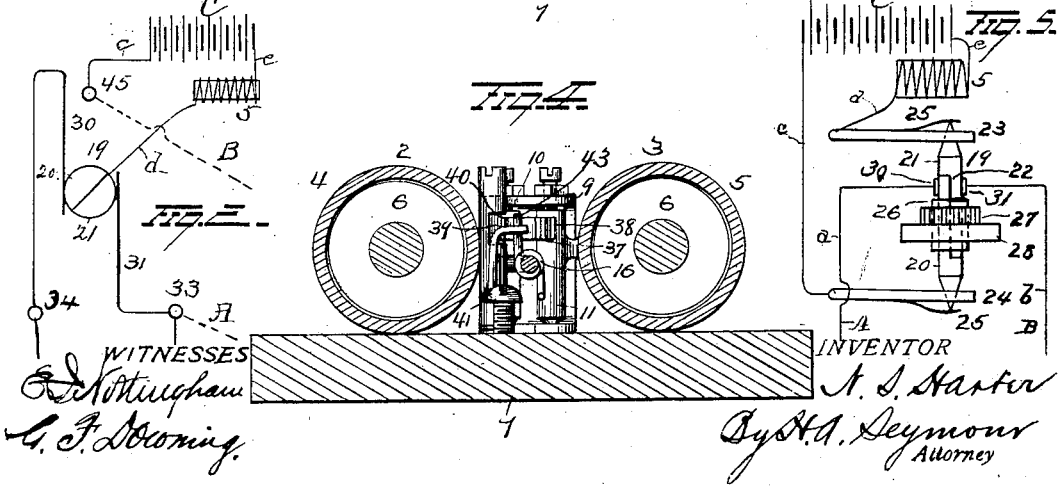

No. 738,437.

Patented September 8, 1903.

UNITED STATES PATENT OFFICE.

NOAH S. HARTER, OF CHEROKEE, IOWA.

APPARATUS FOR CHANGING CHARACTER OF ELECTRIC CURRENTS.

SPECIFICATION forming part of Letters Patent No. 738,437, dated September 8, 1903.

Application filed May 27, 1903. Serial No. 159,034. (No model.)

*To all whom it may concern:*

Be it known that I, NOAH S. HARTER, of Cherokee, in the county of Cherokee and State of Iowa, have invented certain new and useful Improvements in Apparatus for Changing Character of Electric Currents; and I do hereby declare the following to be a full, clear, and exact description of the invention, such as will enable others skilled in the art to which it appertains to make and use the same.

My invention relates to apparatus for changing the character of electric currents from a battery or other generator, and more particularly to improve devices which can be made to operate to effect rapid changes in direction of currents from a generator and also for causing a pulsatory current to flow over a line-circuit.

One object of the invention is to provide in a single apparatus means for causing an electric current from a battery or other generator to flow over the line-circuit as a pulsatory current or to cause the current from the battery to rapidly alternate in direction over the line-circuit.

A further object is to so construct an apparatus of the class above mentioned that the various parts thereof can be readily adjusted.

A further object is to provide a simple and efficient apparatus for changing the polarity of an electric current for various purposes where an alternating current is desired.

A further object is to provide an apparatus for rapidly changing the direction of current over the line-circuit, for operating polarized bells, or for other purposes, and to so construct said apparatus that it will remain at rest when the line or external circuit is open and so that it will start automatically and positively when the line-circuit is closed and continue to operate until the line-circuit shall have been again opened.

A further object is to provide an apparatus for the purpose stated which shall be simple in construction, comprise comparatively few parts, which shall be durable and not easy to get out of order, and which shall operate accurately and effectually in the performance of its functions.

With these objects in view the invention consists in certain novel features of construction and combinations and arrangements of parts, as hereinafter set forth, and pointed out in the claims.

In the accompanying drawings, Figure 1 is a diagrammatical view. Fig. 2 is a diagram showing the circuit including the battery, commutator, and also showing the manner of connecting the external circuit when a pulsatory current is desired. Figs. 3 and 4 are sectional views taken at right angles to each other. Fig. 5 is a view showing the details of the commutator and the manner of connecting it in circuit.

1 represents a suitable base, on which two iron shells 2 3 are located, said shells inclosing electromagnets 4 5. Each of these shells is open at one end and closed at the other end, and the cores of the magnets are secured to the closed ends of the shells. Disks 6 are located on each magnet-core for retaining the coils or helices 7 8 of the magnets in place. In proximity to the poles of the magnets and between the shells a bracket 9 is fixed to the base 1. In this bracket two posts 10 11 are pivotally mounted, the post 10 carrying an armature 12 for the magnet 4 and the post 11 supporting an armature 13 for the magnet 5. Screws 14 15, having flattened heads, are inserted into the base near the armatures and serve for adjusting the throw or movement of the latter. An arm 16, secured to the pivoted post 10, is disposed between the two magnets and projects slightly beyond the rear ends thereof, where it is provided with a horizontally-disposed rack-bar 17. The armature 12 of the magnet 4 is maintained normally in and returned to a position away from the pole of the magnet and against the screw 14 by means of a spring 18, attached to the base 1 and bearing against the arm 16, said spring also serving to normally maintain the rack-bar at one end of its throw and return it to such position. The purpose of the rack-bar and its actuating means is to operate the commutator 19, which is, in effect, a pole-changer, as will be hereinafter more fully explained. The commutator 19 comprises two members 20 21, separated by suitable insulating material 22 and assembled so as to form an arbor mounted at its respective ends in bearings 23 and 24. To insure perfect electrical connections with the members 20 21 of the commutator-arbor, spring-fingers 25 are provided and bear against the pointed ends of said members. The members 20 21 of the commutator-arbor are held together by a short sleeve 26, of insulating material, and on this sleeve a pinion 27 is secured so as to mesh with and receive motion from the rack-bar 17. A balance-wheel 28 is also secured to the sleeve 26. The members 20 21 of the commutator are preferably provided with silver or platinum contact-pieces 29, against which contact-brushes 30 31 bear, said brushes being also preferably provided with silver or platinum contact-pieces to insure perfect electrical connection with the commutator members. The commutator-brushes can be conveniently held in posts 32, secured to the base 1.

The commutator-brush 30 is connected by a wire $a$ with a binding-post 33, to which one of the line-wires A is connected, and the commutator-brush 31 is connected by a wire $b$ with the binding-post 34, to which the other line-wire B is attached. One pole of a battery C is connected with a binding-post 35, and the other pole of said battery is connected with a binding-post 36. The binding-post 36 is connected by a wire $c$ with the commutator member 20, and the commutator member 21 is connected by a wire $d$ with one end of the coil of magnet 5, the other end of said coil being connected by a wire $e$ with the binding-post 35.

The armature 13 of magnet 5 carries an arm 37, projecting between the magnets, and to this arm a spring contact-finger 38 is attached and adapted (when the armature 13 is actuated) to make electrical contact with a pin 39, adjustably attached to the base 1. The armature 13 is maintained in and returned to normal position by means of a spring 40, secured at one end to the arm 37 and bearing at its other end against a post 41, secured to the base 1. This post is provided with a flattened face where the spring bears against it, so that by turning the post the tension of the spring can be adjusted. This spring also serves to normally maintain the contact-finger 38 out of electric contact with the pin 39. The arm 37 and its spring-finger 38 are connected with the binding-post 35 by means of a conductor $f$, and the contact-pin 39 is connected by a wire $g$ with one end of the coil of magnet 4, the other end of said coil being connected by a wire $h$ with the binding-post 36.

From the above description it will be observed that the magnet 4 is included in a bridge-circuit, which circuit can be traced from one pole of battery C to binding-post 35, by wire $f$ to contact-finger 38, to pin 39, by wire $g$ to coil of magnet 4, from said magnet by wire $h$ to binding-post 36, and thence to the other pole of the battery. When the magnet 4 is energized, the commutator will be actuated and the direction of current from the battery to the line will be reversed. It may be found desirable to connect a condenser 42 between the binding-post 36 and the helix of magnet 5, as shown in Fig. 1.

With the parts in the positions shown in Fig. 1 and the line-circuit closed the path of the current can be traced as follows: from the battery C to binding-post 36 by wire $c$ to commutator member 20, thence by commutator-brush 30 to conductor $a$, thence to binding-post 33, to line A, then returning through line B to binding-post 34, then by wire $b$ to commutator-brush 31, to commutator member 21, then by wire $d$ to coil of magnet 5, thence from the other end of said coil by wire $e$ to binding-post 35, and then to the other terminal of the battery C. The effect of the current in this circuit will be to energize the magnet 5, which will act to close the bridge-circuit including the magnet 4 by bringing the contact-finger 38 into contact with the pin 39. The magnet 4 being thus energized, the arm 16 will be moved and motion will be transmitted through the rack and pinion to the commutator, thus shifting the relation of the commutator-brushes to the commutator members and reversing the direction of the current through the line. The circuit can now be traced from the battery to binding-post 36, to commutator member 20, to brush 31, to binding-post 34, to line B, to line A, to binding-post 33, to commutator-brush 30, to commutator member 21, through coil of magnet 5, to binding-post 35, and thence to the other terminal of the battery. When the magnet 4 has been energized, as above explained, to operate the commutator or pole-changer, a pin 43 on the arm 16 will strike the finger 38 as the arm 16 completes its throw and moves said finger away from the contact-pin 39. This will open the bridge-circuit including the magnet 4, causing the latter to release its armature. The arm 16 will now be returned to its normal position by the spring, and the rack carried by said arm, meshing with the pinion on the commutator, will cause the latter to turn and restore the positions of the commutator members to the brushes first described. The current will now take the path first described over the line. These actions will be repeated rapidly to alternate the direction of current over the line as long as the line-circuit is closed, the circuit of the magnet 5 remaining closed as long as the line-circuit is closed.

Should it be desired to employ a pulsatory current on the line instead of an alternating current, the line-wire B will be connected at 45 directly with one terminal of the battery instead of to the binding-post 34, thus excluding the commutator-brush 30 entirely from the circuit. With the commutator and its brushes arranged as shown in Fig. 2 the circuit may be traced from battery C by wire $c$ to binding-post 45, thence to line B, returning by line A to binding-post 33, thence to commutator-brush 31, to commutator-segment 21 by wire $d$ to coil of magnet 5, and thence by wire $e$ to the other terminal of the battery. When the commutator is shifted so that the segment 20 will engage the brush 31, the circuit will be opened, and when said commutator shall have been again returned to the position shown in Fig. 2 the circuit will be again closed, and thus as the commutator is oscillated and the circuit alternately opened and closed a pulsatory current will be sent over the line.

Various slight changes might be made in the details of construction of my invention without departing from the spirit thereof or limiting its scope, and hence I do not wish to limit myself to the precise details herein set forth.

Having fully described my invention, what I claim as new, and desire to secure by Letters Patent, is—

1. The combination with a continuous-current generator and a line-circuit, of a circuit-controller disposed between the generator and line-circuit, actuating means for the circuit-controller, a bridge-circuit between the terminals of the generator and a magnet in said bridge-circuit for controlling the actuating means of said controller.

2. The combination with a continuous-current generator and an external or line circuit, of a circuit-controller disposed between the generator and external or line circuit, actuating means for the circuit-controller, a bridge-circuit between the terminals of the generator, a magnet in said bridge-circuit for controlling the actuating means of said controller and means for automatically controlling said bridge-circuit.

3. The combination with a generator and an external or line circuit, of a pole-changer between the generator and external or line circuit, actuating means for the pole-changer, a bridge-circuit between the terminals of the generator, a magnet in said bridge-circuit having its armature connected with the actuating means of the pole-changer, and means for alternately opening and closing said bridge-circuit automatically.

4. The combination with a generator and an external or line circuit, of a pole-changer between the generator and external or line circuit, actuating means for the pole-changer, a bridge-circuit, between the terminals of the generator, a magnet included in said bridge-circuit having its armature connected with the actuating means of the pole-changer, means for closing the bridge-circuit when the external circuit is closed and means alternately opening and closing said bridge-circuit automatically as long as the external circuit is closed.

5. The combination with a generator and an external or line circuit, of a pole-changer between the generator and external or line circuit, actuating means for the pole-changer, a bridge-circuit between the terminals of the generator, a magnet in said bridge-circuit having its armature connected with the actuating means of the pole-changer, a magnet included in circuit with the generator, pole-changer and external circuit for closing the bridge-circuit, and means controlled by the magnet in the bridge-circuit for alternately opening and closing said bridge-circuit as long as the external circuit is closed.

6. The combination with a generator and an external or line circuit, of a pole-changer between the generator and external or line circuit, actuating means for the pole-changer, a bridge-circuit between the terminals of the generator, a circuit-closer for said bridge-circuit, a magnet in the bridge-circuit having its armature connected with the actuating means of the pole-changer, a magnet included in circuit with the generator, pole-changer and line for closing said circuit-closer, and means controlled by the actuating means of the pole-changer for opening and closing said circuit-closer.

7. The combination with a generator and an external or line circuit, of a pole-changer between the generator and external or line circuit, a magnet included in circuit with the pole-changer, a bridge-circuit between the terminals of the generator, a magnet included in the bridge-circuit, a contact-finger carried by the armature of the first-mentioned magnet, a fixed contact-pin coöperating with said contact-finger and included therewith in the bridge-circuit, actuating means for the pole-changer controlled by the magnet in the bridge-circuit, and means controlled by said actuating means for alternately opening and closing said bridge-circuit.

8. The combination with a generator and an external circuit, of a commutator comprising two insulated members, commutator-brushes bearing on the commutator and included in circuit with the generator and external circuit, and means controlled by said generator for operating the commutator for alternating the direction of current from said generator to the external circuit.

9. The combination with a generator and an external circuit, of a commutator comprising insulated members, commutator-brushes coöperating with said commutator, said commutator and brushes included in series with the generator and external circuit, a bridge-circuit between the terminals of said generator and a magnet in the bridge-circuit for controlling the operation of the commutator to alternate the direction of current over the external circuit.

10. The combination with a generator and an external circuit, of a commutator comprising insulated members, commutator-brushes coöperating with the commutator, said commutator and brushes included in series with the generator and external circuit, a bridge-circuit, a magnet included in said bridge-circuit, a pivoted armature for said magnet, and rack-and-pinion connection between said armature and the commutator.

11. The combination with a generator and an external circuit, of a commutator comprising insulated members, brushes coöperating with the commutator, said commutator and brushes included in series with the generator and external circuit, a bridge-circuit between the terminals of the generator, a magnet included in the bridge-circuit, a pivoted armature for said magnet, mechanical driving means between said armature and the commutator, and means controlled by said magnet for alternately opening and closing the bridge-circuit to alternate the direction of current from the generator over the external circuit.

12. The combination with a generator and an external circuit, of a commutator comprising insulated members, commutator-brushes coöperating with said commutator, said commutator and brushes included in series with the generator and external circuit, a normally open bridge-circuit between the terminals of the generator, an armature for said magnet, mechanical driving means between said armature and commutator, a magnet in series with the generator and external circuit for closing the bridge-circuit and maintaining it closed when the external circuit is closed, and means for rapidly opening and closing the bridge-circuit when the external circuit is closed.

13. The combination with a generator and an external circuit, of an oscillatory pole-changer between the generator and external circuit, a pinion carried by the pole-changer, a magnet in circuit with the generator, a pivoted armature for said magnet, an arm secured to said armature, a rack carried by said arm and meshing with said pinion, and means for rapidly making and breaking the circuit including the magnet.

14. The combination with a generator and an external circuit, of an oscillatory commutator comprising two insulated members, brushes coöperating with the commutator, said commutator and brushes included in series with the generator and external circuit, a pinion carried by the commutator, a bridge-circuit between the terminals of the generator, a magnet included in said circuit, an armature for said magnet, a rack-bar connected with said armature and meshing with said pinion, a circuit-closer in the bridge-circuit, a magnet in the main circuit for closing said circuit-closer when the external circuit is closed, and a pin controlled by the movements of the armature of the magnet in the bridge-circuit for rapidly opening and closing said circuit-closer.

15. The combination with a generator and an external circuit, of a pole-changer between the generator and external circuit, a bridge-circuit between the terminals of the generator, a magnet in the bridge-circuit, a circuit-closer in the bridge-circuit, a pivoted armature for said magnet, means for adjusting the movement of said armature, an arm secured to said armature, mechanical driving means between said arm and pole-changer, a pin on said arm for opening said circuit-closer, a spring for returning the arm and the armature which carries it, a magnet in the main circuit, a pivoted armature for said magnet and carrying one member of said circuit-closer, and means for adjusting the movement of said armature.

In testimony whereof I have signed this specification in the presence of two subscribing witnesses.

NOAH S. HARTER.

Witnesses:
H. H. TOWAN,
GEO. HAGEMAN.